United States Patent
Mester et al.

(10) Patent No.: US 11,415,101 B2
(45) Date of Patent: Aug. 16, 2022

(54) ROTOR BLADE, METHOD FOR MANUFACTURING A ROTOR BLADE FOR A WIND ENERGY INSTALLATION, AND A WIND ENERGY INSTALLATION

(71) Applicant: Siemens Gamesa Renewable Energy Service GmbH, Hamburg (DE)

(72) Inventors: Hendrik Mester, Kiel (DE); Enno Eyb, Kiel (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 0 days.

(21) Appl. No.: 17/298,325

(22) PCT Filed: Nov. 26, 2019

(86) PCT No.: PCT/EP2019/082521
§ 371 (c)(1),
(2) Date: May 28, 2021

(87) PCT Pub. No.: WO2020/109278
PCT Pub. Date: Jun. 4, 2020

(65) Prior Publication Data
US 2022/0025849 A1     Jan. 27, 2022

(30) Foreign Application Priority Data
Nov. 28, 2018 (DE) .................... 10 2018 009 336.1

(51) Int. Cl.
*F03D 1/06* (2006.01)

(52) U.S. Cl.
CPC ........ *F03D 1/0683* (2013.01); *F05B 2240/21* (2013.01); *F05B 2240/301* (2013.01);
(Continued)

(58) Field of Classification Search
CPC .... F03D 1/0633; F03D 1/0641; F03D 1/0675; F03D 1/0683; F05B 2240/301;
(Continued)

(56) References Cited

U.S. PATENT DOCUMENTS

| 4,976,587 A | * | 12/1990 | Johnston | ............... F03D 1/0675 |
| | | | | 416/239 |
| 9,169,825 B2 | * | 10/2015 | Auberon | ............... F03D 1/0675 |

(Continued)

FOREIGN PATENT DOCUMENTS

| DE | 102008007304 A1 | 8/2009 |
| DE | 102010002432 A1 | 9/2011 |

(Continued)

OTHER PUBLICATIONS

European Patent Office; Search Report in related International Patent Application No. PCT/EP2019/082521 dated Feb. 12, 2020; 6 pages.

(Continued)

*Primary Examiner* — Courtney D Heinle
*Assistant Examiner* — Sang K Kim
(74) *Attorney, Agent, or Firm* — Dorton & Willis, LLP

(57) ABSTRACT

A rotor blade for a wind energy installation includes a blade root, a blade tip, and at least one rotor blade shell extending in a longitudinal direction from the blade root to the blade tip, and having an inner shell region and an outer shell region. The inner shell region includes a first fiber composite with at least two first fiber layers, and the outer shell region includes a second fiber composite with at least two second fiber layers. The first and second fiber layers extend substantially in the longitudinal direction. At least a first fiber layer of the first fiber composite terminates in the region of at least one end position in the longitudinal direction, whereas the remaining first fiber layers extend beyond the (Continued)

end position. At least a second fiber layer of the second fiber composite terminates in the region of the end position in the longitudinal direction, whereas the remaining second fiber layers extend beyond the end position.

10 Claims, 2 Drawing Sheets

(52) U.S. Cl.
CPC .............. *F05B 2280/6003* (2013.01); *F05B 2280/6008* (2013.01); *F05B 2280/6013* (2013.01)

(58) Field of Classification Search
CPC ...... F05B 2280/6001; F05B 2280/6002; F05B 2280/6003; F05B 2280/6013
See application file for complete search history.

(56) References Cited

U.S. PATENT DOCUMENTS

| | | | |
|---|---|---|---|
| 9,879,541 B2 * | 1/2018 | Torgard | ................. B29C 70/48 |
| 2011/0171038 A1 | 7/2011 | Esaki et al. | |
| 2011/0211971 A1 | 9/2011 | Bendel et al. | |
| 2012/0027609 A1 | 2/2012 | Ogde et al. | |
| 2012/0082554 A1 | 4/2012 | Baker et al. | |
| 2016/0169194 A1* | 6/2016 | Yarbrough | ............ F03D 1/0683 |
| | | | 29/889.7 |

FOREIGN PATENT DOCUMENTS

| | | |
|---|---|---|
| DE | 102012104238 A1 | 11/2012 |
| DE | 102016101663 A1 | 8/2017 |
| EP | 3032094 A1 | 6/2016 |

OTHER PUBLICATIONS

European Patent Office; Written Opinion in related International Patent Application No. PCT/EP2019/082521 dated Feb. 12, 2020; 8 pages.
German Patent Office; Search Report in related German Patent Application No. 10 2018 009 336.1 dated Sep. 30, 2019; 10 pages.
Griffin, Dayton A., "Blade System Design Studies vol. II: Preliminary Blade Designs and Recommended Test Matrix, SAND2004-0073", SANDIA National Laboratories, (Jun. 1, 2004), pp. 1-79, URL: http://infoserve.sandia.gov/sand_doc/2004/040073.pdf, (Jun. 1, 2016), XP055276953 [A] 1-8 p. 52-p. 55; figures 22-24.

* cited by examiner

A - A

ROTOR BLADE, METHOD FOR MANUFACTURING A ROTOR BLADE FOR A WIND ENERGY INSTALLATION, AND A WIND ENERGY INSTALLATION

CROSS-REFERENCE TO RELATED APPLICATIONS

This application is a national phase application under 35 U.S.C. § 371 of International Patent Application No. PCT/EP2019/082521, filed Nov. 26, 2019 (pending), which claims the benefit of priority to German Patent Application No. DE 10 2018 009 336.1, filed Nov. 28, 2018, the disclosures of which are incorporated by reference herein in their entirety.

TECHNICAL FIELD

The invention relates to a rotor blade for a wind energy installation, a method of manufacturing a rotor blade for a wind energy installation, as well as to a wind energy installation.

BACKGROUND

In rotor blades for wind energy installations, the thickness of the rotor blade shells usually decreases towards the blade tip. In the case of rotor blade shells which are formed by a laminate of several laminate layers, this is achieved by a reduction of the laminate layers towards the blade tip, but this leads to jumps in the stiffness and an offset in the neutral fiber of the rotor blade due to the finite thickness of the laminate layers.

SUMMARY

It is an object of the present invention to provide a rotor blade with improved properties, a method of manufacturing such a rotor blade, as well as a corresponding wind energy installation.

This object is solved by a rotor blade, a method of manufacturing a rotor blade, and a wind energy installation as disclosed herein.

A rotor blade for a wind energy installation in accordance with a first aspect of the invention comprises a blade root, a blade tip, and at least one rotor blade shell which extends in a longitudinal direction from the blade root to the blade tip and which comprises an inner shell region and an outer shell region, wherein the inner shell region comprises a first fiber composite which comprises at least two first fiber layers, and wherein the outer shell region comprises a second fiber composite which comprises at least two second fiber layers, and wherein the first and second fiber layers extend substantially in the longitudinal direction. The rotor blade is in particular characterized in that at least a first fiber layer of the first fiber composite terminates at, or in the region of, at least one end position in relation to the longitudinal direction, whereas any remaining first fiber layers of the first fiber composite, in case they are present, extend beyond the end position, and at least a second fiber layer of the second fiber composite terminates at, or in the region of the same—or substantially the same—end position in relation to the longitudinal direction, whereas any remaining second fiber layers of the second fiber composite, in case they are present, extend beyond the end position.

A second aspect of the invention relates to a method of manufacturing a rotor blade for a wind energy installation, wherein the rotor blade comprises a blade root, a blade tip and at least one rotor blade shell which extends in a longitudinal direction from the blade root to the blade tip and which comprises an inner shell region and an outer shell region, wherein the inner shell region comprises a first fiber composite and the outer shell region comprises a second fiber composite, and wherein the method is characterized in particular by the following steps: manufacturing the first fiber composite from at least two first fiber layers which extend substantially in the longitudinal direction, wherein at least a first fiber layer of the first fiber composite terminates at, or in the region of, at least one end position in relation to the longitudinal direction, whereas any remaining first fiber layers of the first fiber composite in case they are present, extend beyond the end position, and manufacturing the second fiber composite from at least two second fiber layers which extend substantially in the longitudinal direction, wherein at least a second fiber layer of the second fiber composite terminates at, or in the region of, the same—or substantially the same—end position in relation to the longitudinal direction, whereas any remaining second fiber layers of the second fiber composite, in case they are present, extend beyond the end position.

A wind energy installation in accordance with a third aspect of the invention comprises at least one rotor blade in accordance with the first aspect of the invention and/or at least one rotor blade obtained by a method in accordance with the second aspect of the invention.

Preferred aspects of the invention are based on the approach that individual or multiple laminate layers of a laminate which is located in the region of the inner side of the rotor blade shell, an inner laminate, as it is referred to, and a laminate which is located in the region of the outer side of the rotor blade shell, an outer laminate, as it is referred to, each terminate at, or in the region of, the same longitudinal position and/or the same relative blade length of the rotor blade shell or of the rotor blade. For example, a laminate layer of the inner laminate terminates at, or in the region of, the same longitudinal position and/or the same relative blade length as a laminate layer of the outer laminate, while all of the remaining laminate layers of the inner and outer laminates extend beyond this longitudinal position. If applicable, one or more of the remaining laminate layers of the inner and outer laminates may terminate only at a further, common longitudinal position or at a further relative blade length, in particular a greater relative blade length. The same applies to two or more laminate layers of the inner and outer laminates.

By means of this, the offset in the neutral fiber of the rotor blade shell or of the rotor blade can be reduced or minimized. As a result of a reduced offset, which may still be present, there may be an induced bending load, which leads to an additional compressive stress on the outer side and a tensile stress on the inner side when the shell is subjected to a tensile load. Since the outer side is generally exposed to higher stresses due to the bending of the rotor blade, the induced compressive stress is of additional benefit for the construction.

The advantages mentioned above come into play in particular in the case of transitions from there being only one fiber layer in each of the inner and outer laminates to there being no fiber layer and vice versa. This applies in particular when the fiber layers are unidirectional layers (UD layers or UD plies, as they are referred to), in which all fibers are oriented in a single direction and preferably run substantially parallel and/or are homogeneously distributed, and/or when there is a transition from a UD layer (stiff) to a multi-axial layer (soft), for example to a BIAX layer, as it is referred to. The stiffer and thicker the terminating layer, the greater the offset of the neutral fiber. Further, by means of the invention, it becomes possible to reduce the amount of material used.

Overall, by means of the invention, a rotor blade with improved properties and a method of manufacturing such a rotor blade are provided, as well as a corresponding wind energy installation.

Preferably, the number of first fiber layers and second fiber layers respectively terminating at, or in the region of, the same end position is identical. In the simplest case, a first fiber layer of the first fiber composite of the inner shell region and a second fiber layer of the second fiber composite of the outer shell region terminate at a common end position in relation to the longitudinal direction. Any possibly existing jump in the stiffness and/or offset in the neutral fiber in the inner and outer shell regions can be kept particularly small by means of this. In principle, however, it is also possible to have more than just one fiber layer respectively terminating at, or in the region of, a common end position, for example respectively two, three or more first and second fiber layers.

Further, it is preferred that the remaining first fiber layers of the first fiber composite and the remaining second fiber layers of the second fiber composite each extend beyond the end position in the direction towards the blade tip. In this embodiment, the wall thickness of the rotor blade shell can be reduced towards the blade tip, whereby, at the same time, any jumps in the stiffness and/or an offset in the neutral fiber can be reduced.

Preferably, two or more different end positions are provided, at each of which at least one first fiber layer of the first fiber composite and at each of which at least one second fiber layer of the second fiber composite terminates, wherein the respective remaining first fiber layers of the first fiber composite and the respective remaining second fiber layers of the second fiber composite extend beyond the respective end position in the direction towards the blade tip, so that the number of first and second fiber layers in the first and second fiber composite, respectively, and/or the thickness of the first and second fiber composite, respectively, and/or the thickness of the rotor blade shell gradually decreases in the longitudinal direction towards the blade tip. For example, four to eight common end positions, in particular five to seven common end positions, in particular six common end positions, may be provided at which each of at least one first fiber layer and at least one second fiber layer terminates. Preferably, the number of first and second fiber layers terminating at, or in the region of, a respective common end position is the same. In this way, the wall thickness of the rotor blade shell can gradually be reduced towards the blade tip, whereby any jumps in the stiffness and/or any offset in the neutral fiber can be kept particularly low.

Further, it is preferred that a core material, in particular at least one layer of a core material, is provided between the outer shell region and the inner shell region. The core material may be, for example, a layer or layers of foam and/or balsa wood. The foam layer or layers and/or the balsa wood layer or layers which are inserted between the fiber composites of the outer and inner shell regions form a sandwich structure, together with the fiber composites. In principle, core materials other than those specified above are also conceivable.

Preferably, at at least one end, the fiber composite of each of the inner shell region and/or of the outer shell region terminates with that first fiber layer or with that second fiber layer which is closest to a neutral fiber of the rotor blade shell. In other words, the respective terminating layer of the inner shell laminate or of the outer shell laminate advantageously faces towards the neutral fiber of the rotor blade shell, or the inner shell laminate and the outer shell laminate preferably always terminate with the respective inner layer. This avoids a situation where there is a free end at the surface.

Further advantages, features and possible applications of the present invention will be apparent from the following description in connection with the figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
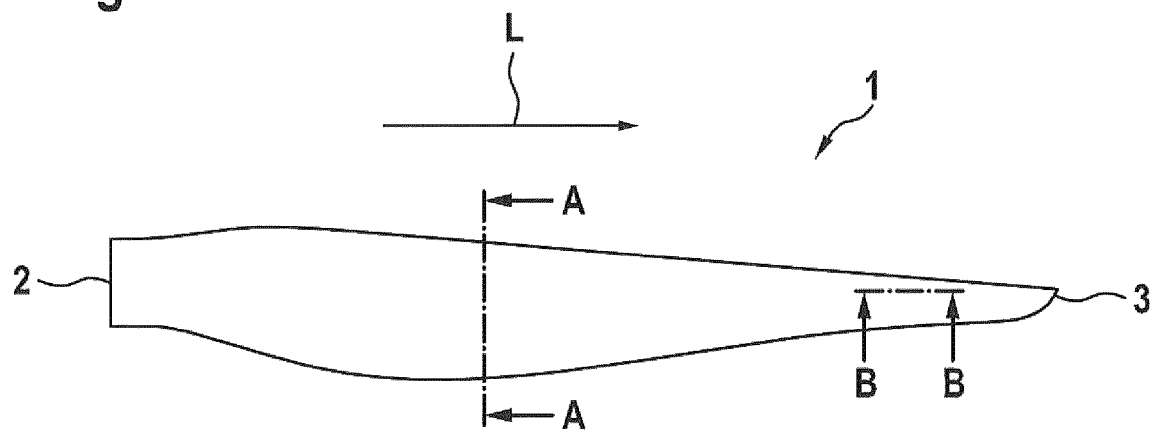
FIG. 1 depicts an example of a rotor blade in a side view.

FIG. 1 shows a side view of an example of a rotor blade 1 which extends in a longitudinal direction L from a blade root 2, at which the rotor blade 1 is connected to the hub (not shown) of a wind energy installation, to a blade tip 3.

Figure 2:
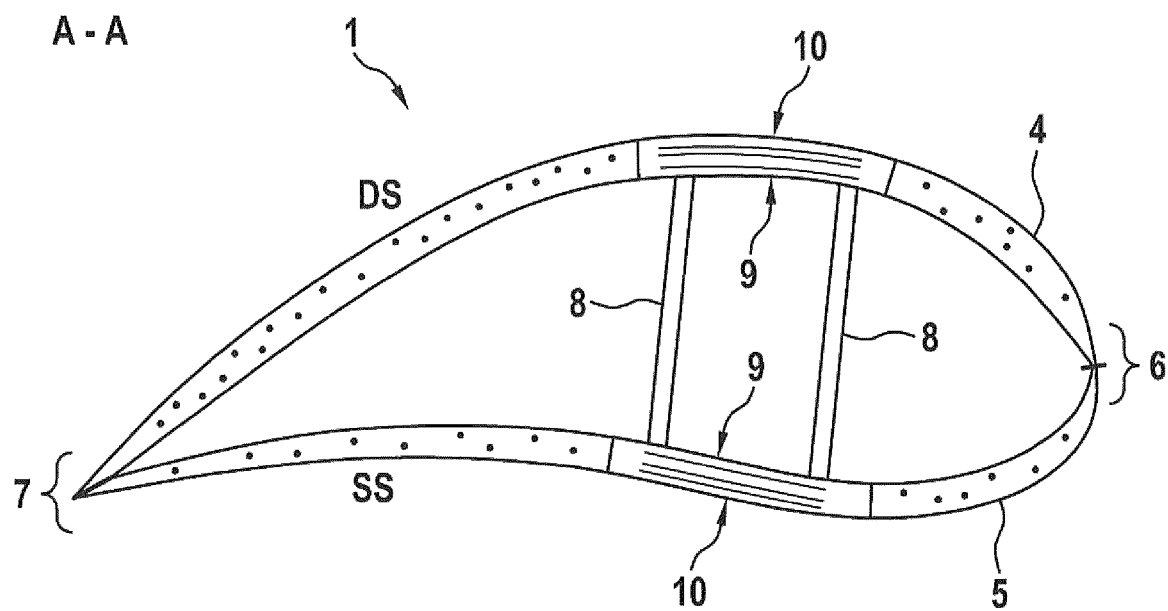
FIG. 2 depicts an example of a cross section through a rotor blade transverse to the longitudinal direction.

FIG. 2 shows an example of a cross section A-A through the rotor blade 1 shown in FIG. 1, perpendicular to the longitudinal direction L. The rotor blade 1 preferably has a first rotor blade shell 4 which is located in the area of the pressure side DS, as it is referred to, of the rotor blade 1, and a second rotor blade shell 5 which is located in the area of the suction side SS, as it is referred to, of the rotor blade 1.

The two rotor blade shells 4, 5 are connected to each other, for example glued to each other, in each of the area of the nose 6, as it is referred to, and the trailing edge 7, as it is referred to, of the rotor blade 1. Further, one or more spars or webs 8 can be provided, which are bonded to the two rotor blade shells 4, 5, in particular via a respective suction side and pressure side rotor blade chord.

The rotor blade shells 4, 5 each have an inner shell region 9 and an outer shell region 10, wherein the inner shell region 9 is formed by a first fiber composite of first fiber layers and the outer shell region 10 is formed by a second fiber composite of second fiber layers. This is further illustrated below with reference to FIG. 3.

Figure 3:
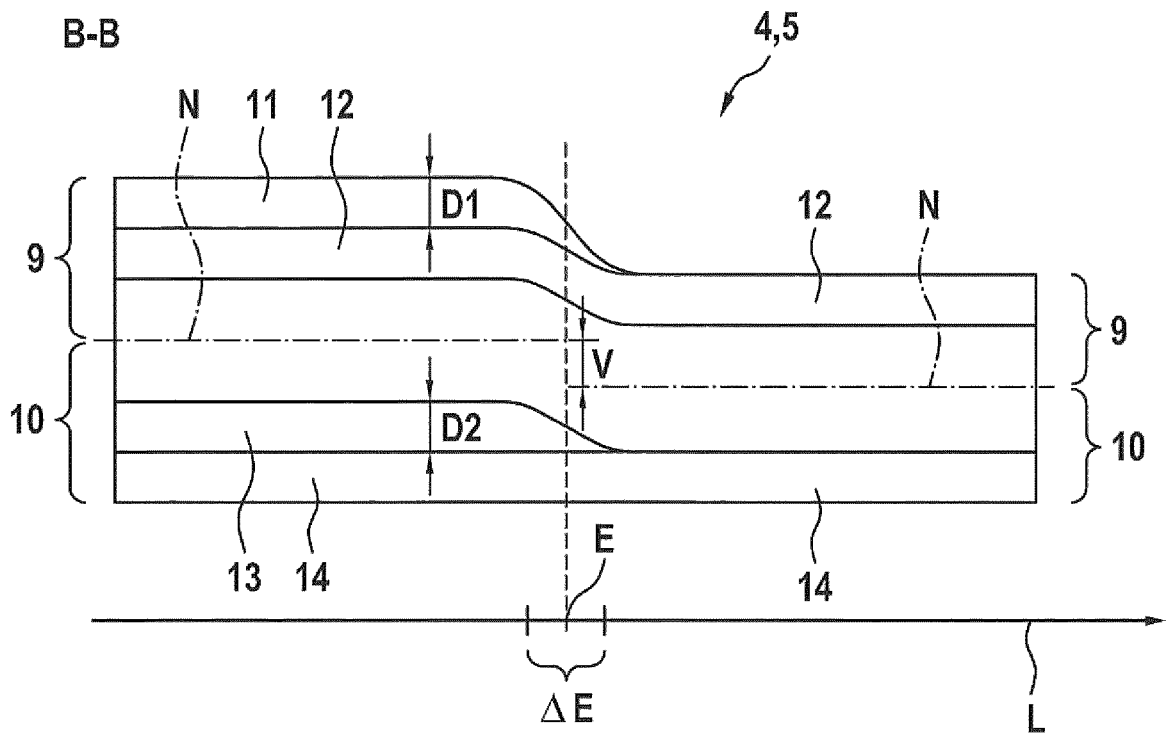
FIG. 3 depicts an example of a cross section through a portion of a rotor blade shell in the longitudinal direction.

FIG. 3 shows an example of a cross section B-B through a portion of a rotor blade shell 4, 5 in the longitudinal direction L, which section is located near the blade tip 3 of the rotor blade 1 (see FIG. 1).

In the portion shown, the rotor blade shell 4, 5 has an inner shell region 9, which is formed by a first fiber composite, which has two first fiber layers 11, 12 in a left-hand part of this portion, and only one first fiber layer 12 in a right-hand part of this portion. Further, in the portion shown, the rotor blade shell 4, 5 has an outer shell region 10, which is formed by a second fiber composite, which has two second fiber layers 13, 14 in the left-hand part of this portion, and only one second fiber layer 14 in the right-hand part of this portion. The first and second fiber layers 11 to 14 preferably extend substantially in the longitudinal direction L of the rotor blade.

The neutral fiber N is also illustrated (as a line in which dots alternate with dashes) in the portion of the rotor blade shell 4, 5 shown. The neutral fiber N, which is also referred to as the "neutral axis" or "zero line", is to be understood as that line, plane or (partial) layer in the cross section of the rotor blade shell 4, 5 whose length does not change when the rotor blade shell 4, 5 is twisted and/or bent, for example. In the region of the neutral fiber N, a load does not cause any tensile or compressive stress. By way of contrast, the tensile or compressive stress increases with the distance from the neutral fiber N in the direction perpendicular thereto, for example in the case of a tensile load on the rotor blade shell during operation of the rotor blade, and is, as a rule, at a maximum at the surface of the inner shell region 9 and the outer shell region 10, respectively.

In the example shown, a first fiber layer 11 of the first fiber composite of the inner shell region 9 terminates in a region ΔE around an end position E in relation to the longitudinal direction L, whereas the remaining first fiber layer 12 of the first fiber composite extends further in the longitudinal direction L beyond the end position E.

Further, a second fiber layer 13 of the second fiber composite of the outer shell region 10 terminates in the region ΔE around the same end position E, whereas the remaining second fiber layer 14 of the second fiber composite extends further in the longitudinal direction L beyond the end position E.

In this way, on the one hand, the wall thickness of the rotor blade shell 4, 5, in particular the sum of the respective thicknesses of the individual layers of the inner shell region 9 and of the outer shell region 10, can be reduced and, on the other hand, a possible jump in the stiffness and/or a possible offset V of the neutral fiber N in the region ΔE around the end position E associated with the reduction in thickness can be kept low.

For example, the offset V of the neutral fiber N would be greater if, in the present example, a reduction in the thickness by only one fiber layer only in the inner one of the two shell regions 9 had been carried out.

Further, although the offset V of the neutral fiber N would be of a similar amount if, in the present example, a reduction in the thickness by one fiber layer had been carried out only in the outer one of the two shell regions 10. However, an induced bending load would result, which, when the shell is subjected to a tensile load, leads to an additional tensile stress on the outer side and a compressive stress on the inner side. Since the outer side is generally subjected to higher stresses due to the bending of the rotor blade, the induced compressive stress is additionally detrimental to the construction.

By keeping an offset V in the neutral fiber N of the rotor blade shell 4, 5 low in this way, the tensile forces acting on the rotor blade shell 4, 5 during bending of the rotor blade generate lower bending moments in the region of the location or locations at which the wall thickness of the rotor blade shell has been reduced in this way, so that compressive stresses on the outer side of the rotor blade shell and/or tensile stresses on the inner side of the rotor blade shell resulting therefrom can be kept low.

In principle, it is particularly advantageous if the first fiber layer or layers 11 and the second fiber layer or layers 13 terminate as precisely as possible at the same end position E, or at least substantially at the same end position E. However, the advantages of the invention already become noticeable if the first fiber layer or layers 11 and the second fiber layer or layers 13 terminate within a finite area ΔE around the same end position E. The width of the area ΔE around the end position E is preferably of the order of magnitude of the thickness D1 of the terminating first fiber layer or layers 11 and/or the thickness D2 of the terminating second fiber layer or layers 13. For example, the width of the area ΔE in this case is k×D1 or k×D2, where k is between 0.5 and 50, in particular between 1 and 20.

Figure 4:
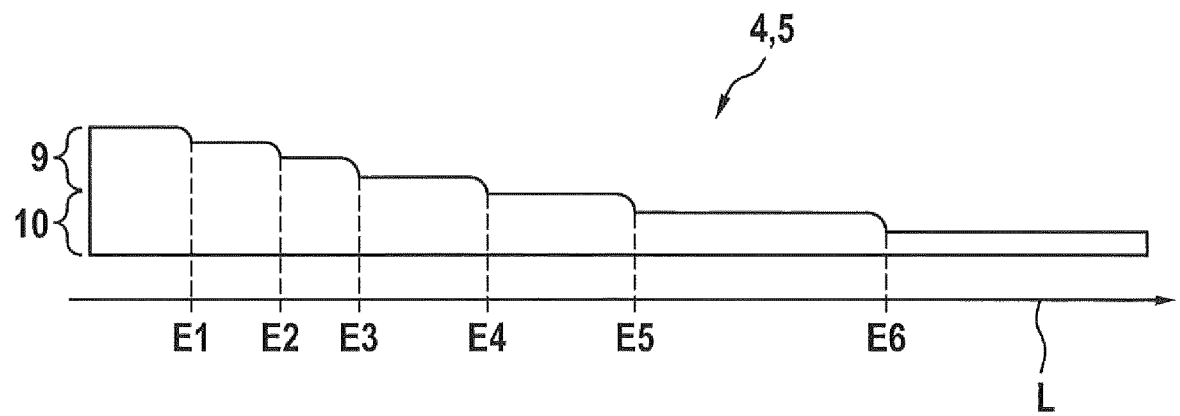
FIG. 4 depicts an example of a cross section through a rotor blade shell along the length of the blade.

FIG. 4 shows an example of a cross section through a rotor blade shell 4, 5 over the entire blade length in the longitudinal direction L. In this example, the wall thickness of the rotor blade shell 4, 5 has been reduced at a total of six end positions E1 to E6 analogously to the example explained above in connection with FIG. 3, for example in that, at the first end position E1, each of a first fiber layer of a first fiber composite, for example a first fiber composite which has a total of seven first fiber layers, terminates at the inner shell region 9, and a second fiber layer of a second fiber composite, for example a second fiber composite which has a total of seven second fiber layers, terminates at the outer shell region 10, whereas the respective remaining six first fiber layers and six second fiber layers extend further in the longitudinal direction L beyond the first end position E1.

In a corresponding manner, the wall thickness of the rotor blade shell 4, 5 can be reduced at the further end positions E2 to E6 by each of one first fiber layer and one second fiber layer, so that only one first fiber layer and one second fiber layer are present in the region of the blade tip.

Of course, however, a larger and/or a smaller total number of first fiber layers and/or second fiber layers can also be provided. In addition, or as an alternative, the number of first fiber layers and second fiber layers, each of which terminate at one of the end points E1 to E6, can also be greater than 1.

Preferably, the area between the outer shell laminate and the inner shell laminate 9 and 10, respectively, is formed by a layer of core material.

In a particularly advantageous manner, the end of the layer of the inner shell laminate and/or of the outer shell laminate 9 and 10, respectively, is located such that it faces towards the neutral fiber N. In other words, the inner shell laminate and/or the outer shell laminate 9 and 10, respectively, preferably always terminates with the respective inner layer. By means of this, a free end at the surface can be avoided.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A rotor blade for a wind energy installation, the rotor blade comprising:
   a blade root;
   a blade tip;

at least one rotor blade shell extending in a longitudinal direction from the blade root to the blade tip, the rotor blade shell comprising an inner shell region and an outer shell region;

the inner shell region comprising a first fiber composite including at least two first fiber layers;

the outer shell region comprising a second fiber composite including at least two second fiber layers;

wherein the first and second fiber layers extend in the longitudinal direction;

wherein at least one first fiber layer of the first fiber composite terminates at, or in the region of, at least one end position in relation to the longitudinal direction, and remaining ones of the first fiber layers of the first fiber composite extend beyond the at least one end position; and wherein at least one second fiber layer of the second fiber composite terminates at, or in the region of, the at least one end position in relation to the longitudinal direction, and remaining ones of the second fiber layers of the second fiber composite extend beyond the at least one end position;

wherein the rotor blade includes four to eight end positions, and at least one first fiber layer of the first fiber composite and at least one second fiber layer of the second fiber composite terminate at each of the end positions;

wherein the respective remaining first fiber layers of the first fiber composite and the respective remaining second fiber layers of the second fiber composite extend beyond the respective end position in a longitudinal direction towards the blade tip, such that at least one of:
the number of first and second fiber layers in the first and second fiber composite, respectively, gradually decreases in the longitudinal direction towards the blade tip,
the thickness of the first or second fiber composites, respectively, gradually decreases in the longitudinal direction towards the blade tip, or
the thickness of the rotor blade shell gradually decreases in the longitudinal direction towards the blade tip.

2. The rotor blade of claim 1, wherein the number of first fiber layers that terminate in the region of the end position is equal to the number of second fiber layers that terminate in the region of the end position.

3. The rotor blade of claim 1, wherein the remaining first fiber layers of the first fiber composite and the remaining second fiber layers of the second fiber composite extend beyond the end position in a direction towards the blade tip.

4. The rotor blade of claim 1, further comprising a core material between the outer shell region and the inner shell region.

5. The rotor blade of claim 4, wherein the core material is a layer of a core material disposed between the outer shell region and the inner shell region.

6. A wind energy installation, comprising:
at least one rotor blade according to claim 1;
wherein the at least one rotor blade is connected to a hub of the wind energy installation.

7. The rotor blade of claim 1, wherein the at least one first fiber layer of the first fiber composite and the at least one second fiber layer of the second fiber composite terminate within a distance of between 0.5 and 50 times a thickness of a fiber layer from each other.

8. The rotor blade of claim 1, wherein the at least one first fiber layer of the first fiber composite and the at least one second fiber layer of the second fiber composite terminate within a distance of between 1 and 20 times a thickness of a fiber layer from each other.

9. A rotor blade for a wind energy installation, the rotor blade comprising:
a blade root;
a blade tip;
at least one rotor blade shell extending in a longitudinal direction from the blade root to the blade tip, the rotor blade shell comprising an inner shell region and an outer shell region;
the inner shell region comprising a first fiber composite including at least two first fiber layers;
the outer shell region comprising a second fiber composite including at least two second fiber layers;
wherein the first and second fiber layers extend in the longitudinal direction;
wherein at least one first fiber layer of the first fiber composite terminates at, or in the region of, at least one end position in relation to the longitudinal direction, and remaining ones of the first fiber layers of the first fiber composite extend beyond the at least one end position;
wherein at least one second fiber layer of the second fiber composite terminates at, or in the region of, the at least one end position in relation to the longitudinal direction, and remaining ones of the second fiber layers of the second fiber composite extend beyond the at least one end position; and
wherein at least one end of at least one of the first fiber composite of the inner shell region or the second fiber composite of the outer shell region terminates with the respective first fiber layer or second fiber layer which is closest to a neutral fiber of the rotor blade shell.

10. A method of manufacturing a rotor blade for a wind energy installation, wherein the rotor blade comprises a blade root, a blade tip, and at least one rotor blade shell extending in a longitudinal direction from the blade root to the blade tip, the rotor blade shell comprising an inner shell region and an outer shell region, wherein the inner shell region comprises a first fiber composite and the outer shell region comprises a second fiber composite, the method comprising:
manufacturing the first fiber composite from at least two first fiber layers that extend in the longitudinal direction;
wherein at least a first fiber layer of the first fiber composite terminates at, or in the region of, at least one end position in relation to the longitudinal direction, and remaining ones of the first fiber layers of the first fiber composite extend beyond the end position; and
manufacturing the second fiber composite from at least two second fiber layers that extend in the longitudinal direction;
wherein at least a second fiber layer of the second fiber composite terminates at, or in the region of the end position in relation to the longitudinal direction, and remaining ones of the second fiber layers of the second fiber composite extend beyond the end position;
wherein the rotor blade includes four to eight end positions, and at least one first fiber layer of the first fiber composite and at least one second fiber layer of the second fiber composite terminate at each of the end positions;
wherein the respective remaining first fiber layers of the first fiber composite and the respective remaining second fiber layers of the second fiber composite extend beyond the respective end position in a longitudinal direction towards the blade tip, such that at least one of:

the number of first and second fiber layers in the first and second fiber composite, respectively, gradually decreases in the longitudinal direction towards the blade tip, the thickness of the first or second fiber composites, respectively, gradually decreases in the longitudinal direction towards the blade tip, or the thickness of the rotor blade shell gradually decreases in the longitudinal direction towards the blade tip.

\* \* \* \* \*